United States Patent
Stedtfeld et al.

[11] Patent Number: 6,158,798
[45] Date of Patent: Dec. 12, 2000

[54] MULTI-USE STRUCTURE FOR A PICKUP TRUCK

[76] Inventors: Robert G. Stedtfeld, 3795 Sunnyside Rd., Idaho Falls, Id. 83406; Jon Gordon Stedtfeld, Box 175, Arco, Id. 83213

[21] Appl. No.: 09/459,971

[22] Filed: Dec. 13, 1999

[51] Int. Cl.⁷ .................................................. B62D 25/00
[52] U.S. Cl. ................... 296/61; 296/10; 296/36; 296/43; 182/127; 182/178.2; 414/537
[58] Field of Search ................... 296/10, 14, 61, 296/32, 36, 43, 62; 224/403, 405, 310; 414/537; 182/127, 178.2

[56] References Cited

U.S. PATENT DOCUMENTS

| | | | |
|---|---|---|---|
| 3,319,811 | 5/1967 | Martin, Jr. . | |
| 3,510,015 | 5/1970 | Roshaven . | |
| 3,989,148 | 11/1976 | Donohue . | |
| 4,216,988 | 8/1980 | Weiss ......................................... | 296/43 |
| 4,687,076 | 8/1987 | Tu .......................................... | 182/178 |
| 4,751,981 | 6/1988 | Mitchell et al. ......................... | 182/127 |
| 4,842,317 | 6/1989 | Moore ...................................... | 296/36 |
| 4,991,690 | 2/1991 | Woller ...................................... | 182/93 |
| 5,211,437 | 5/1993 | Gerulf ...................................... | 296/61 |
| 5,553,762 | 9/1996 | Brown . | |
| 5,558,486 | 9/1996 | Paproski . | |
| 5,597,195 | 1/1997 | Meek . | |
| 5,649,732 | 7/1997 | Jordan et al. ............................. | 296/26 |

Primary Examiner—D. Glenn Dayoan
Assistant Examiner—Mickki D. Murray
Attorney, Agent, or Firm—Henderson & Sturm LLP

[57] ABSTRACT

A multi-use structure for use in combination with a pickup truck. The structure includes a pair of longitudinal panels, each panel having a number of pocket stakes that are movably adjustable along the bottom edge of the panel to align with the pockets in the sidewalls of a pickup bed. This adjustment allows the panels to be used as sideboards on a variety of pickup truck models that may have various stake pocket spacings. When the situation requires, the panels may be removed from the stake pockets and the panels may be positioned at the rear of the truck and used as ramps. A strap with a lip positioned at one end of each panel extends down to engage the tailgate or bed of the truck to provide a firmer grip when the panels are positioned as ramps. A pair of sleeves attached at one end of one of the panels acts to telescopically connect the panels in end-to-end relationship where the panels may be used as a ladder or bridge. The panels may also be placed under the drive wheels of the truck to provide traction needed in muddy or snowy conditions.

17 Claims, 4 Drawing Sheets

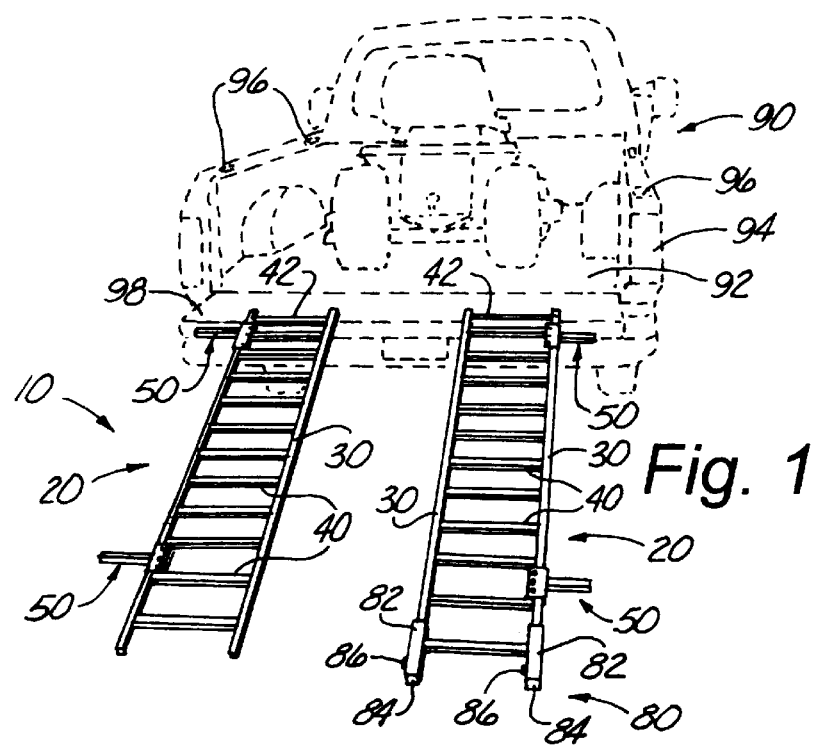
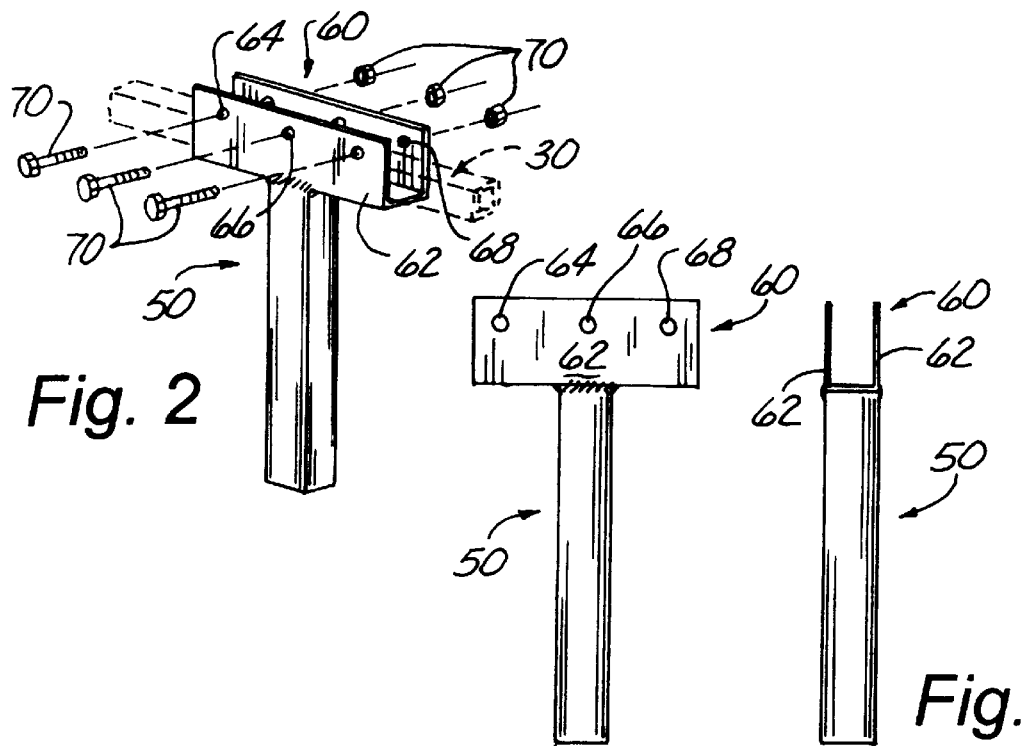

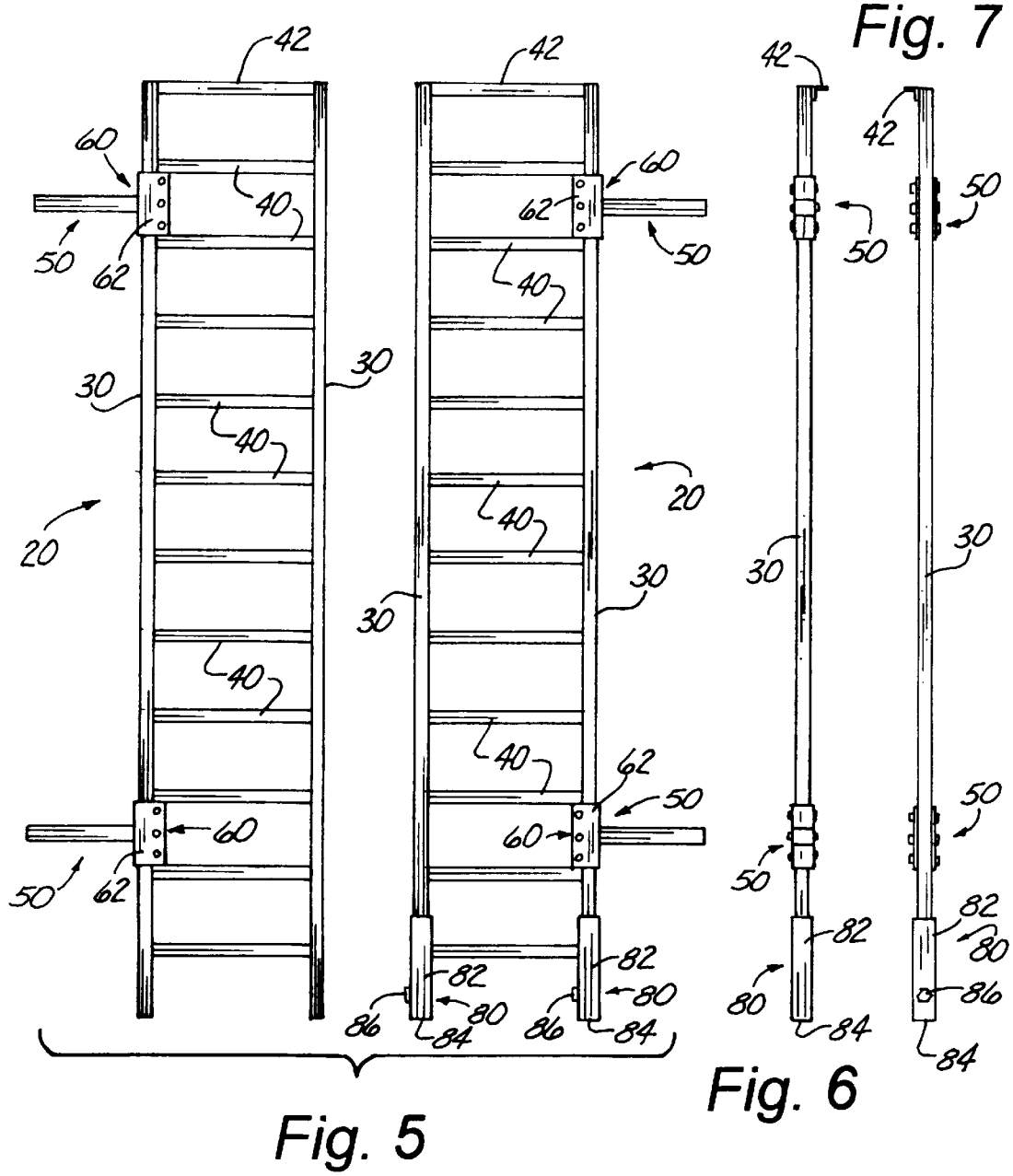

MULTI-USE STRUCTURE FOR A PICKUP TRUCK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the field of vehicle accessories, and more particularly to a multi-use structure for a pickup truck.

2. Description of the Related Art

As can be seen by reference to the following U.S. Pat. Nos. 3,989,148; 5,553,762; 5,558,486 and 5,597,195, the prior art is replete with myriad and diverse vehicle ramp and side board constructions.

While all of the aforementioned prior art constructions are more than adequate for the basic purpose and function for which they have been specifically designed, they are uniformly deficient with respect to their failure to provide a simple, efficient and practical multi-use structure for use in combination with a pickup truck.

As a consequence of the foregoing situation, there has existed a longstanding need for a new and improved multi-use structure and the provision of such a construction is a stated objective of the present invention.

BRIEF SUMMARY OF THE INVENTION

Briefly stated, the present invention provides a multi-use structure for use in combination with a pickup truck. The structure includes a pair of longitudinal panels, each panel having a number of pocket stakes that are movably adjustable along the bottom edge of the panel to align with the pockets in the sidewalls of a pickup bed. This adjustment allows the panels to be used as sideboards on a variety of pickup truck models that may have various stake pocket spacings. When the situation requires, the panels may be removed from the stake pockets and the panels may be positioned at the rear of the truck and used as ramps. A strap with a lip positioned at one end of each panel extends down to engage the tailgate or bed of the truck to provide a firmer grip when the panels are positioned as ramps. A pair of sleeves attached at one end of one of the panels acts to telescopically connect the panels in end-to-end relationship where the panels may be used as a ladder or bridge. The panels may also be placed under the drive wheels of the truck to provide traction needed in muddy or snowy conditions.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 a perspective view illustrating the multi-use structure of the present invention being used as a pair of ramps;

FIG. 2 is an enlarged perspective view of a pocket stake being adjustably attached to the bottom edge of one of the panels;

FIG. 3 is a side elevational view of the pocket stake;

FIG. 4 is an end elevational view of the pocket stake;

FIG. 5 is a top plan view illustrating the pair of panels as used in the ramp configuration;

FIG. 6 is a side elevational view of the right-hand side of the right-hand panel shown in FIG. 5;

FIG. 7 is a left-side elevational view thereof;

DETAILED DESCRIPTION OF THE INVENTION

Figure 8:
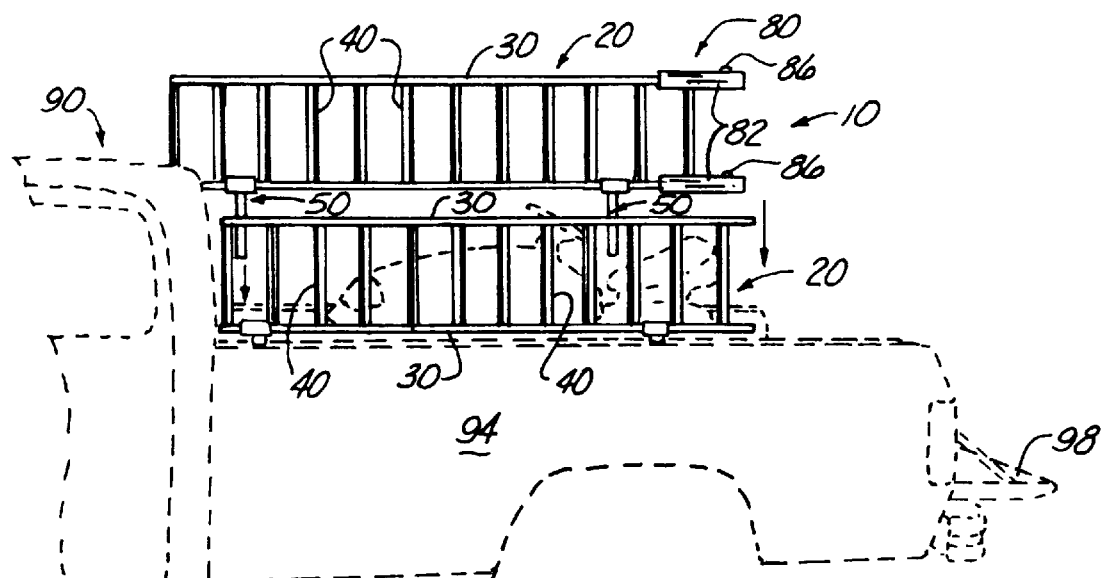
FIG. 8 is a side elevational view illustrating one of the panels secured as a side board of the pickup, and the other panel being moved down into the side board position.

As can be seen by reference to the drawings, and in particular to FIG. 1, the multi-use structure that forms the basis of the present invention is designated generally by the reference numeral 10. The structure 10 includes a pair of panels 20, a number of adjustably movable pocket stakes 50, and a telescopic connector 80. The structure 10 is designed for use in combination with a pickup truck 90 having a truck bed 92, sidewalls 94 with stake pockets 96, and a tailgate 98.

As most clearly shown in FIGS. 5–7, the panels 20 include a pair of spaced parallel bars 30 interconnected by rungs 40 and an end strap 42 which has an extending lip 44. Pocket stakes 50, shown in detail in FIGS. 2–4, are attached to one of the bars 30 on each panel 20. A saddle 60 includes spaced walls 62 that receive a section of the bar 30 and have three pairs of registered openings 64, 66, 68 that receive threaded fasteners 70 (FIG. 2) to adjustably secure the pocket stake 50 to one edge of the panel 20.

Figure 9:
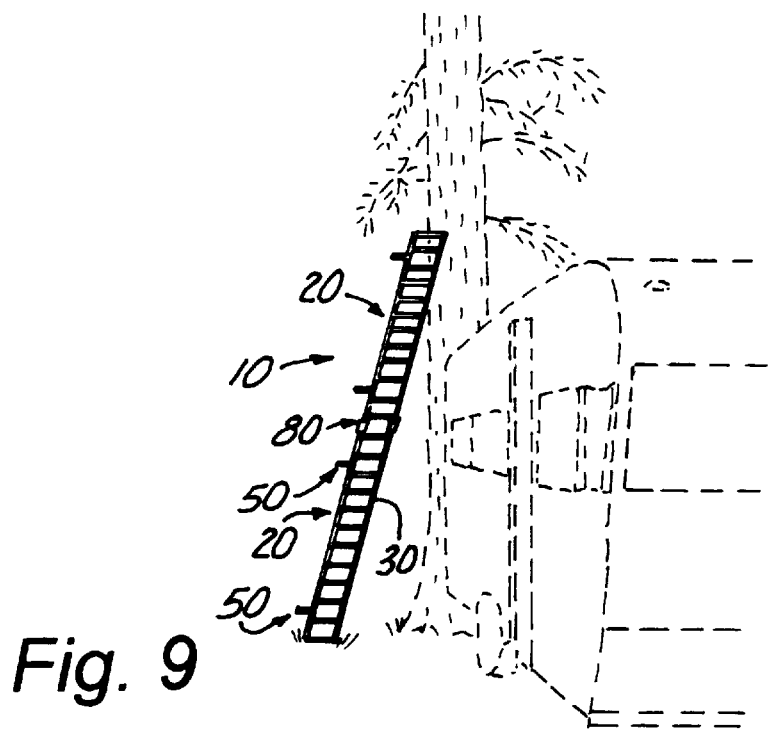
FIG. 9 is a perspective view illustrating the panels connected end-to-end and being used as a ladder.
Figure 10:
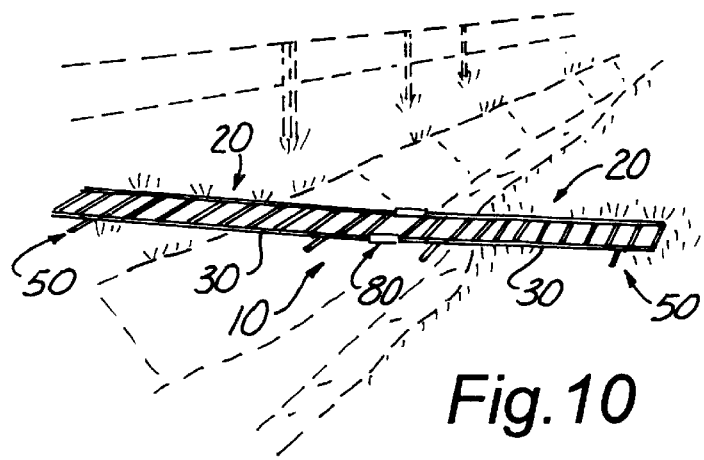
FIG. 10 is a perspective view illustrating the same structure being used as a bridge.
Figure 11:
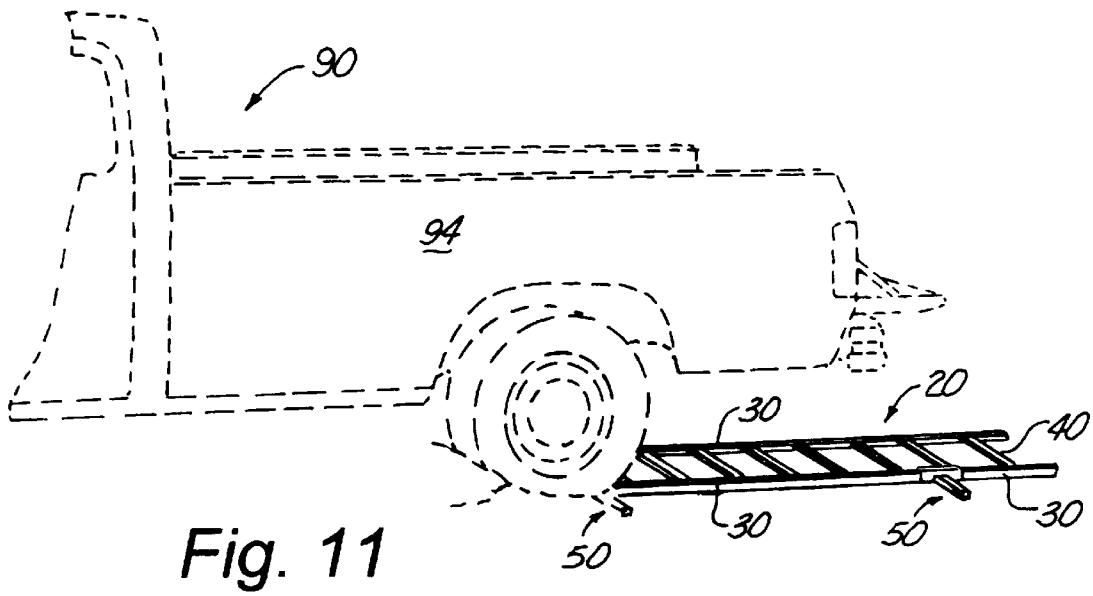
FIG. 11 is a perspective view showing one of the panels under the wheels of a truck to provide traction.

The telescopic connector 80 comprises a pair of sleeves 82 attached to one end of one panel 20 as clearly shown in FIG. 5. The sleeves 82 extend coaxially out from the bars 30 at one end of the panel 20 and have a cavity 84 in the free end which telescopically receives the free ends of the bars 30 of the other panel 20. Set screws 86 secure the panels 20 in end-to-end relationship suitable for use as a ladder (FIG. 9) or as a bridge to span small streams (FIG. 10). Individual panels 20 may also be used under the tires of the truck to enhance traction in mud or snow (FIG. 11). It is anticipated that the primary use of the structure 10 will be as ramps (FIG. 1) and as side boards (FIG. 8).

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. In combination with a pickup truck having a truck bed, sidewalls extending up from the truck bed including a plurality of pockets, and a tailgate extending between the sidewalls, a multi-use structure comprising:

a pair of longitudinal panels, each panel having a top edge, a bottom edge, a first end, and a second end;

a plurality of pocket stakes attached to and being adjustably movable along the bottom edge of each panel, each pocket stake being selectively positioned to be matingly received in one of the plurality of pockets of the truck sidewalls; and a connector attached to one of the ends of one of the pair of panels, and being disposed to matingly receive one of the ends of another of the pair of panels and selectively connect the pair of panels in an end-to-end relationship.

2. The structure of claim 1 wherein each of the pair of panels includes a pair of spaced parallel bars defining the top and bottom edges of such panel, and a plurality of spaced parallel rungs attached to and interconnecting the bars; and wherein each pocket stake is adjustably movable along the bar defining the bottom edge of each panel.

3. The structure of claim 2 wherein each pocket stake is attached to the bar defining the bottom edge of each panel by a saddle disposed to extend parallel to and matingly receive a section of the bar.

4. The structure of claim 3 wherein the saddle includes spaced walls that extend above and on each side of the bar when it is received in the saddle, and wherein threaded fasteners extend through pairs of registered openings in a portion of the spaced walls above the bar, whereby the pocket stakes are adjustably movable along the bottom edge of each panel to align with the pockets in the sidewalls of the truck bed.

5. The structure of claim 4 wherein there are at least three pairs of registered openings in each saddle, spaced at intervals wherein at least two of the three pairs of openings are positioned to receive the threaded fasteners without being obstructed by one of the rungs.

6. The structure of claim 2 wherein the connector includes a sleeve attached to and extending coaxially out from each of the spaced parallel bars at the first end of one of the panels, the sleeves including a cavity disposed to telescopically matingly receive the spaced parallel bars at the first end of the other of the panels.

7. The structure of claim 6 wherein the sleeves include a set screw disposed to contact and secure the bar at the first end of the other of the panels when the panels are positioned in the end-to-end relationship.

8. The structure of claim 2 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

9. The structure of claim 3 wherein the connector includes a sleeve attached to and extending coaxially out from each of the spaced parallel bars at the first end of one of the panels, the sleeves including a cavity disposed to telescopically matingly receive the spaced parallel bars at the first end of the other of the panels.

10. The structure of claim 9 wherein the sleeves include a set screw disposed to contact and secure the bar at the first end of the other of the panels when the panels are positioned in the end-to-end relationship.

11. The structure of claim 4 wherein the connector includes a sleeve attached to and extending coaxially out from each of the spaced parallel bars at the first end of one of the panels, the sleeves including a cavity disposed to telescopically matingly receive the spaced parallel bars at the first end of the other of the panels.

12. The structure of claim 11 wherein the sleeves include a set screw disposed to contact and secure the bar at the first end of the other of the panels when the panels are positioned in the end-to-end relationship.

13. The structure of claim 3 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

14. The structure of claim 4 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

15. The structure of claim 5 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

16. The structure of claim 6 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

17. The structure of claim 7 further including a strap attached to and interconnecting the spaced parallel bars at the second end of each of the panels, each strap including a lip disposed to extend out from the panel, whereby the lip is disposed to engage the tailgate or bed of the truck when the panel is positioned behind the tailgate to be used as a ramp.

* * * * *